(12) United States Patent
Delaney

(10) Patent No.: US 11,403,881 B2
(45) Date of Patent: Aug. 2, 2022

(54) CONTENT MODIFICATION BASED ON EYE CHARACTERISTICS

(71) Applicant: PayPal, Inc., San Jose, CA (US)

(72) Inventor: Jennifer Delaney, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 127 days.

(21) Appl. No.: 15/626,791

(22) Filed: Jun. 19, 2017

(65) Prior Publication Data

US 2018/0365491 A1    Dec. 20, 2018

(51) Int. Cl.
*G06V 40/19* (2022.01)
*G06V 40/18* (2022.01)
*G06Q 50/18* (2012.01)
*G06F 40/103* (2020.01)
*G06F 40/166* (2020.01)

(52) U.S. Cl.
CPC .......... *G06V 40/197* (2022.01); *G06F 40/103* (2020.01); *G06F 40/166* (2020.01); *G06Q 50/18* (2013.01); *G06V 40/19* (2022.01)

(58) Field of Classification Search
CPC ........................ G06F 3/013; G06K 9/00604; G06K 9/00617; G09G 2320/066; G06Q 50/18
USPC ......................................... 348/78, 77, 61, 64
See application file for complete search history.

(56) References Cited

U.S. PATENT DOCUMENTS

| | | | | |
|---|---|---|---|---|
| 7,881,493 | B1 * | 2/2011 | Edwards | G06V 40/18 348/78 |
| 8,345,935 | B2 * | 1/2013 | Angell | G06V 20/52 382/117 |
| 9,691,182 | B1 * | 6/2017 | Katzer | G06T 19/006 |
| 9,798,385 | B1 * | 10/2017 | Das | A61B 5/4824 |
| 9,864,498 | B2 * | 1/2018 | Olsson | G06F 1/1686 |
| 9,886,598 | B2 * | 2/2018 | Ziaja | G06F 21/84 |
| 10,108,316 | B2 * | 10/2018 | Lyons | G06F 3/013 |
| 10,241,576 | B2 * | 3/2019 | Cheaz | G06F 3/011 |
| 10,281,980 | B2 * | 5/2019 | Ayoub | G09G 5/30 |
| 10,379,709 | B2 * | 8/2019 | Todasco | G06F 3/013 |
| 10,466,776 | B2 * | 11/2019 | Gonzales, Jr. | G06F 3/013 |
| 10,503,252 | B2 * | 12/2019 | Ayoub | G06F 3/147 |
| 10,614,586 | B2 * | 4/2020 | Benedetto | G06F 3/013 |
| 2010/0039618 | A1 * | 2/2010 | De Lemos | A61B 5/163 351/209 |

(Continued)

OTHER PUBLICATIONS

Claudio M. Privitera, et al., "The pupil dilation response to visual detection," Human Vision and Electronic Imaging, XIII, Proc. of SPIE-IS&T Electronic Imaging, Jan. 27-31, 2008, SPIE vol. 6806, 68060T-1.

*Primary Examiner* — Brian P Yenke

(57) ABSTRACT

According to an aspect of an embodiment of the present disclosure, a device may include an optical scanner, a display, and one or more storage media storing instructions. The device may also include one or more processors configured to execute the instructions to cause the device to perform operations. The operations may include presenting content to a user of the device via the display, and capturing a depiction of an eye of the user via the optical scanner. The operations may also include comparing a size of a pupil of the eye of the user in the depiction to a reference size of a pupil stored in the one or more storage media to determine an amount of dilation of the eye of the user. The method may also include modifying, based on the amount of dilation, the presentation of the content.

20 Claims, 5 Drawing Sheets

(56) References Cited

U.S. PATENT DOCUMENTS

| | | | | |
|---|---|---|---|---|
| 2013/0022948 | A1* | 1/2013 | Angell | G06K 9/00604 |
| | | | | 434/236 |
| 2013/0212655 | A1 | 8/2013 | Hoyos et al. | |
| 2013/0243270 | A1* | 9/2013 | Kamhi | H04N 21/458 |
| | | | | 382/118 |
| 2014/0064578 | A1* | 3/2014 | Choe | G06K 9/3233 |
| | | | | 382/128 |
| 2014/0122335 | A1 | 5/2014 | Deshmukh et al. | |
| 2015/0127524 | A1* | 5/2015 | Jacobs | G06Q 40/025 |
| | | | | 705/38 |
| 2015/0154445 | A1* | 6/2015 | Biswas | G06K 9/00604 |
| | | | | 345/2.3 |
| 2015/0213634 | A1* | 7/2015 | Karmarkar | A61B 5/163 |
| | | | | 345/589 |
| 2015/0358594 | A1* | 12/2015 | Marshall | G06F 3/012 |
| | | | | 345/419 |
| 2016/0019420 | A1 | 1/2016 | Feng et al. | |
| 2016/0381415 | A1* | 12/2016 | Vijay | H04N 21/4415 |
| | | | | 725/12 |
| 2017/0293407 | A1* | 10/2017 | Todasco | G06F 3/015 |
| 2017/0303187 | A1* | 10/2017 | Crouthamel | H04W 56/0015 |
| 2017/0357846 | A1* | 12/2017 | Dey | G06K 9/0061 |
| 2018/0088666 | A1* | 3/2018 | Ayoub | G06F 3/013 |
| 2018/0204058 | A1* | 7/2018 | Yoo | G06V 40/197 |
| 2018/0255167 | A1* | 9/2018 | Saito | G06K 9/00536 |
| 2018/0284876 | A1* | 10/2018 | Ray | G06F 1/3231 |
| 2018/0286070 | A1* | 10/2018 | Benedetto | G06F 3/013 |
| 2018/0301110 | A1* | 10/2018 | Feng | G06T 1/20 |
| 2019/0026369 | A1* | 1/2019 | Olsson | G06F 3/0481 |
| 2019/0026864 | A1* | 1/2019 | Chen | G06T 3/4046 |
| 2019/0205681 | A1* | 7/2019 | Huang | G06T 7/73 |
| 2020/0089317 | A1* | 3/2020 | Ghajar | G06F 3/013 |
| 2020/0133453 | A1* | 4/2020 | Walker | G06F 3/011 |
| 2020/0159986 | A1* | 5/2020 | Djamasbi | G06F 40/40 |

* cited by examiner

CONTENT MODIFICATION BASED ON EYE CHARACTERISTICS

FIELD

Embodiments of the present disclosure relate to content modification based on eye characteristics.

BACKGROUND

As users observe content, they may be mentally engaged or may grow tired or weary of observing content. A typical way to tell if a user is tired of the content being provided is a lack of response to the content or the user closing or exiting the content.

BRIEF DESCRIPTION OF THE DRAWINGS

Example embodiments will be described and explained with additional specificity and detail through the use of the accompanying drawings in which.

DETAILED DESCRIPTION

It has been observed that when a person engages in a mental task such as memorizing, the pupil of the eye dilates, and when the person reports the memorized material, the pupil constricts. It has also been observed that the rate of change of the eye from dilated to constricted and vice versa may be related to the difficulty of the task. Thus, the dilation of pupils may be an indication of mental engagement (e.g., how hard the user is thinking about something) and the constriction of pupils may indicate mental disengagement (e.g., the user was thinking hard but has given up, solved a problem, or does not want to think about something). One or more embodiments of the present disclosure may use such a physiological response with respect to the presentation of content and/or the performance of various tasks using a computing device. For example, a user may be presented with content (e.g., financial information) from a particular service provider (e.g., PAYPAL®). The amount of pupil dilation may be measured while the user is observing the content to determine an amount of mental engagement of the user. Based on the amount of dilation, the content may be modified with different terms or presented to the user with different terminology. For example, if the eyes of the user dilate when the content is first presented and then they constrict when a certain term in the content is encountered, more explanation may be provided regarding that term.

As another example, rather than traditional approaches to verify that a human rather than a bot is utilizing an electronic resource, characters may be presented for memorization and reporting back. The observation of dilation that occurs during memorization and the constriction that occurs when reporting back the characters may be used to identify that a human and not a bot is utilizing or requesting an electronic resource.

Various embodiments of the present disclosure may improve the operation of a computer. For example, computing resources may be preserved for actual human users rather than wasting those resources on bots. Additionally, the present disclosure may improve the related field of human-computer interactions. For example, a computing device may be enabled to provide content based on the human user's actual level of understanding or mental engagement based on physiological input, allowing real-time modification of content tailored to users and their level of mental engagement.

One or more example embodiments are explained with reference to the accompanying drawings.

Figure 1:
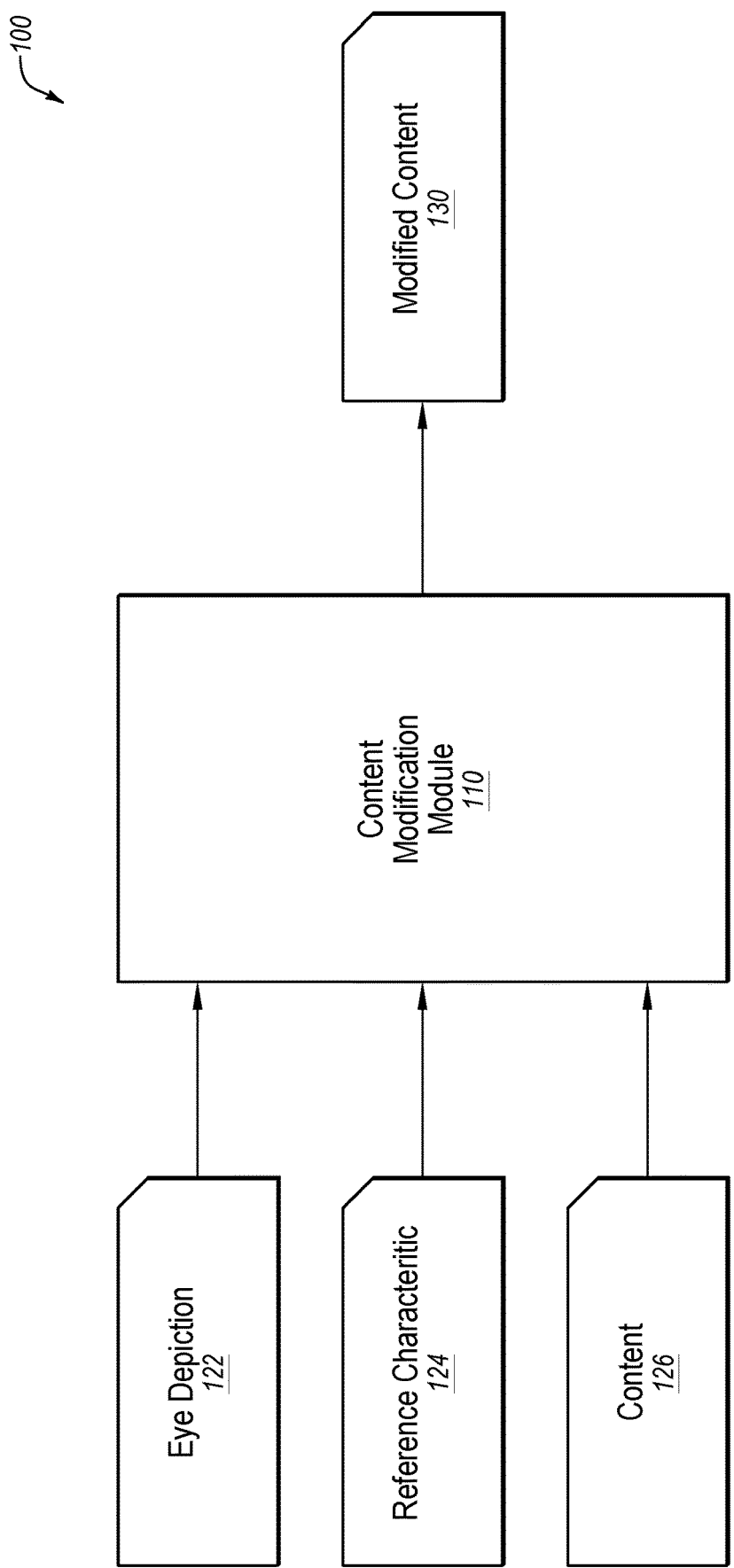
FIG. 1 is a diagram illustrating an example system that may be used to modify content based on eye characteristics.

FIG. 1 is a diagram illustrating an example system 100 that may be used to modify content based on eye characteristics, in accordance with one or more embodiments of the present disclosure. As detailed below, the system 100 may include a content modification module 110 configured to obtain an eye depiction 122 of the eye of a user, to obtain a reference characteristic 124 of the eye of the user, and to obtain content 126. In some embodiments, the content modification module 110 may also be configured to determine a characteristic of the eye of the user based on the eye depiction 122 and may output, as modified content 130, a modification of the content 126 based on the characteristic of the eye of the user.

The content 126 may include any content presented to the user. The content 126 may be presented to the user via a medium where the content 126 may be modified in response to the level of mental engagement of the user and/or a comparison of the characteristic to the reference characteristic 124. Examples of the content 126 may include financial information (e.g., an offer for a line of credit, a percentage rate for the line of credit, a purchase offer, a savings rate, a savings plan, a financial agreement, a shipping cost, shopping cart elements, and/or others), advertising information (e.g., an ad banner, a popup advertisement, and/or other advertisements), terms and conditions (e.g., an agreement or set of instructions that a user is expected to be familiar with or agree to in order to use an electronic resource), input fields (e.g., fields for personal contact information), test questions (e.g., financial questions, standardized test questions, and/or others), human authentication data (e.g., a series of characters to memorize and type back in to verify human use of an electronic resource), and/or others.

The modified content 130 may include content that may be different from the content 126. In some embodiments, the modified content 130 may include the content 126 with one or more additions or omissions made to the content 126. Additionally or alternatively, the modified content 130 may include entirely different content than that of the content 126. Additionally or alternatively, the modified content 130 may include the content 126 with different formatting, such as bolding, font, underline, style, etc. of the content.

The eye depiction 122 may include any representation of the eye of the user. For example, the eye depiction 122 may include a retinal scan of the eye, a photographic image of the eye (digital or analog), a series of images of the eye (e.g., a video of the eye), a laser scan of the eye, other depictions of the eye, and/or data representations of any of the foregoing.

The reference characteristic 124 may include a reference against which a characteristic of the eye may be compared. For example, the reference characteristic may include a size of a pupil (e.g., a dilated-state reference, or a constricted-state reference, and/or others), a location where the eye is looking, and/or others. In some embodiments, the reference characteristic 124 may be obtained from a previously obtained eye depiction for comparison against an eye characteristic that may be included in the eye depiction 122 such that the reference characteristic 124 may be used to determine relative changes in the eye characteristic. Additionally or alternatively, the reference characteristic 124 may have a baseline value with respect to the eye characteristic in which the baseline value may be associated with a "neutral" value of the eye characteristic. For example, in instances in which the reference characteristic 124 is a dilation, the amount of dilation associated with the reference characteristic may be around halfway between fully dilated and fully constricted. In these and other embodiments, a color contrast approach may be utilized in which an automated system may detect various colors in an image and the color contrast between the iris and the pupil may facilitate determination of the boundary between the iris and the pupil. Using the determined boundary, the size of the pupil and differences at various points in time of the size of the pupil may be determined.

In some embodiments, multiple factors may be utilized by the content modification module 110. For example, a combination of pupil dilation and another factor may be analyzed to determine whether the content 120 is to be modified. Such other factors may include a biometric factor (e.g., fingerprint, heart rate, etc.), an authentication code (e.g., a password), a third party application (e.g., whether the user is signed in to a social media service or other third party service). In these and other embodiments, the other factors may be analyzed using one or more sensors of a local device (e.g., for biometric data) or a remote device (e.g., verifying sign-in information).

The content modification module 110 may include code, learning algorithms, and/or routines configured to enable a computing device to perform one or more determinations based on the eye depiction 122, the reference characteristic 124, and/or the content 126 to generate the modified content 130. Additionally or alternatively, the content modification module 110 may be implemented using hardware including a processor, a microprocessor (e.g., to perform or control performance of one or more operations), a field-programmable gate array (FPGA), or an application-specific integrated circuit (ASIC). In some other instances, the content modification module 110 may be implemented using a combination of hardware and software. In the present disclosure, operations described as being performed by the content modification module 110 may include operations that the content modification module 110 may direct a corresponding system to perform.

In some embodiments, the content modification module 110 may be configured to monitor and/or detect variations or changes in a characteristic of the eye of the user. For example, the content modification module 110 may obtain the eye depiction 122 and may determine a characteristic of the eye from the eye depiction 122. The content modification module 110 may compare the characteristic with the reference characteristic 124 to determine whether there has been a variation or change in the characteristic. Based on variations or modifications in the characteristic, the content modification module 110 may determine a change in the content 126 to generate and/or output the modified content 130. In some embodiments, the reference characteristic 124 may include one or more ranges of values in addition to or alternative to a threshold value. For example, a first range of characteristic values may represent a constricted state, a second range of characteristic values may represent a normal state, and a third range of characteristic values may represent a dilated state. As another example, if the pupil size is below a first threshold, the pupil size may be considered constricted, if the pupil size is above a second threshold, the pupil size may be considered dilated, and if the pupil size is between the two threshold values, the pupil size may be considered normal.

By way of example, in some embodiments, the reference characteristic 124 and the eye depiction 122 may be utilized by the content modification module 110 to determine a level of mental engagement of the user. For example, if the reference characteristic 124 includes a size of a pupil in a constricted state, the pupil may be identified in the eye depiction 122 and the size of the pupil in the eye depiction 122 may be determined. The size of the pupil in the eye depiction 122 may be compared to the reference characteristic 124. If the size of the pupil in the eye depiction 122 is larger than the reference characteristic 124 by a threshold amount, the content modification module 110 may determine that the user is mentally engaged because the eye of the user is dilated. As another example, if the size of the pupil in the eye depiction 122 is a comparable size or smaller when compared to the reference characteristic 124, the content modification module 110 may determine that the user is mentally disengaged or has become mentally disengaged. In these and other embodiments, one or more of the ranges of characteristic values and/or the thresholds may also designate a particular state of mental engagement. For example, the first range may be associated with mental disengagement and the third range may be associated with mental engagement.

In some embodiments, the content modification module 110 may determine a rate of change of the characteristic. For example, the content modification module 110 may track how quickly the relative difference between the characteristic from the eye depiction 122 and the reference characteristic 124 diverge or converge. In these and other embodiments, the level of mental engagement may be based on the rate of change. For example, if the pupil of the user dilated very quickly, the content modification module 110 may determine a higher level of mental engagement compared to a circumstance when the pupil of the user dilated more slowly. In these and other embodiments, the eye of the user may be continuously or periodically monitored such that comparisons over time with the reference characteristic 124 may be performed. In these and other embodiments, video images of the eye may be used to facilitate ongoing or continuous monitoring. For example, a size of the pupil may be compared in each video image with the reference size of the pupil to determine whether a change in size exceeds a threshold amount of size difference from the reference image and/or a size difference between video images. In another example, one or more still digital images or scans may be used to determine a rate of the change of the characteristic.

For the various examples of content 126, the content modification module 110 may generate the modified content 130 based on the level of mental engagement of the user and/or a comparison of the characteristic to the reference characteristic 124. For example, the content 126 may include financial information, and based on the mental engagement of the user (e.g., the eye of the user becomes dilated or constricted), the content modification module 110 may modify the financial information in response to the determined mental engagement of the user. For instance, if a line of credit was being offered to a user with several terms of an associated agreement being included in the content 126

(e.g., interest rate, annual percentage rate, minimum purchase amounts, and/or others), the content modification module 110 may monitor the pupil dilation of the user and detect that the pupil of the user dilated at a rapid rate or that the pupil constricted at a rapid rate. The rapid dilation may indicate that the user had to exert a significant amount of brain power to consider or understand the terms of the agreement or the rapid constriction may indicate that the user has either given up trying to understand the terms or is ignoring the terms. In response to the dilation or the constriction (or in response to the rate of dilation or rate of constriction), the content modification module 110 may modify the content to include more explanation for one or more of the terms, or a simplified explanation of one or more of the terms. Additionally or alternatively, the modified content 130 may include modification of the actual terms of the agreement. For example, based on the dilation or constriction (or based on the rate of dilation or rate of constriction), the maximum amount available on the line of credit or an interest rate for the line of credit may be modified.

As another example of the content modification module 110 generating the modified content 130, the content 126 may include terms and conditions for granting access to a service (such as a PAYPAL account). The content modification module 110 may monitor for changes in pupil dilation in the eye of the user. The pupil of the user may initially dilate and remain dilated through a portion of the terms and conditions. However, prior to reaching the end of the terms and conditions, the pupil of the user may constrict, indicating mental disengagement of the user or that the user is giving up reading through the terms and conditions. In response to the constriction of the pupil of the user, the content modification module 110 may modify the content 126 to facilitate the user completing a review of the terms and conditions. For example, the content modification module 110 may provide a popup message asking if the user would like to take a break and return later to finish reviewing the terms and conditions, or if the user would like to have a representative call them to answer questions about the terms and conditions. As an additional example, the content modification module 110 may provide a short activity that the user completes before returning to the terms and conditions. As another example, the content modification module 110 may present a summarized or shortened version of the terms and conditions such that the user may more easily understand the terms and conditions.

As an additional example of the content modification module 110 generating the modified content 130, the content 126 may include an advertisement. The content modification module 110 may monitor for changes in pupil dilation in the eye of the user when the content 126 is presented to the user. The pupil of the user may dilate, indicating that the user is mentally engaged when observing the advertisement. In response to the dilation of the pupil of the user, the content modification module 110 may modify the content 126 to provide additional advertisements related to the content or a popup message or other notification regarding the subject of the advertisement. Additionally or alternatively, the user may be contacted by another medium (e.g., a text message, email, or telephone call) regarding the subject of the advertisement.

As another example of the content modification module 110 generating the modified content 130, the content 126 may include verification content to verify that it is a human using the electronic resource (e.g., similar to a CAPTCHA feature). For example, the content 126 may include a series of characters for the person to memorize and then retype back or some other mentally engaging task. When presented with characters to remember, pupils of the user may dilate (which would not occur for a bot or other non-human seeking access to the electronic resource). Additionally or alternatively, when retyping in characters that have been memorized, the pupils of the user may constrict. In these and other embodiments, based on the amount of dilation and/or constriction, a determination may be made that the user is human. Thus, as the user memorizes the characters or engages in the task, the content modification module 110 may monitor for dilation of the pupil of the person. Additionally or alternatively, if the user is typing the characters back in, the content modification module 110 may monitor for constriction of the pupil of the user as the user types the characters back in. Such an approach may verify that the user is a human and not a bot or other automated process attempting to access an electronic resource. In such an embodiment, the modified content 130 may include access to the electronic resource. Additionally or alternatively, if the accuracy of the rate and/or size of pupil dilation is high, such an approach may be used to verify an identity of a user based on the degree of dilation and/or constriction and/or the rate of dilation and/or constriction. For example, such identity verification may replace or augment a password input requirement.

As another example of the content modification module 110 generating the modified content 130, the content 126 may include standardized test questions. As the user reads through and answers questions, the content modification module 110 may monitor the amount and/or degree of dilation as an indication of how difficult the question is for the user or perceived to be by the user. In response to the questions being easy for the user, the modified content 130 may include harder questions. Additionally or alternatively, if the pupil of the user has been dilated and then constricts, indicating that the user is giving up, the modified content 130 may include easier questions and/or a motivational or inspirational message to encourage the user to keep trying.

As an additional example of the content modification module 110 generating the modified content 130, the content 126 may include a financial quiz. As the user reads through and answers questions, the content modification module 110 may monitor the amount and/or degree of dilation as an indication of how familiar the user is with the financial terms presented in the quiz. In response to the user being familiar with the financial terms, a level of financial savviness may be correlated with the user. Based on the financial savviness of the user as determined by the amount and/or degree of dilation, the modified content 130 may include additional content or access to certain features. For example, the user may be presented with investing options, a value of a line of credit, a type of account, etc. based on the determined degree of financial savviness.

As another example of the content modification module 110 generating the modified content 130, the content 126 may include an electronic shopping cart. As the user observes various elements in the shopping cart, a total cost, or a shipping cost, the content modification module 110 may monitor the amount and/or degree of dilation as an indication of how concerned the user is with a particular element in the cart. For example, if the pupil of the user dilates as the user looks at the fourth item in the cart, the modified content 130 may include a message related to that item. For example, the message may include an offer for a discount on the item, a query whether the user is sure about wanting the item, etc. In these and other embodiments, by addressing the concern of a user with respect to one item in the cart, the user may be more likely to complete the transaction, even without that item.

One skilled in the art, after reviewing this disclosure, may recognize that modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described. Additionally or alternatively, any type of content 126 may be used and any sort of modified content 130 may be generated based on the level of mental engagement and/or mental disengagement determined regarding the content 126.

Figure 2:
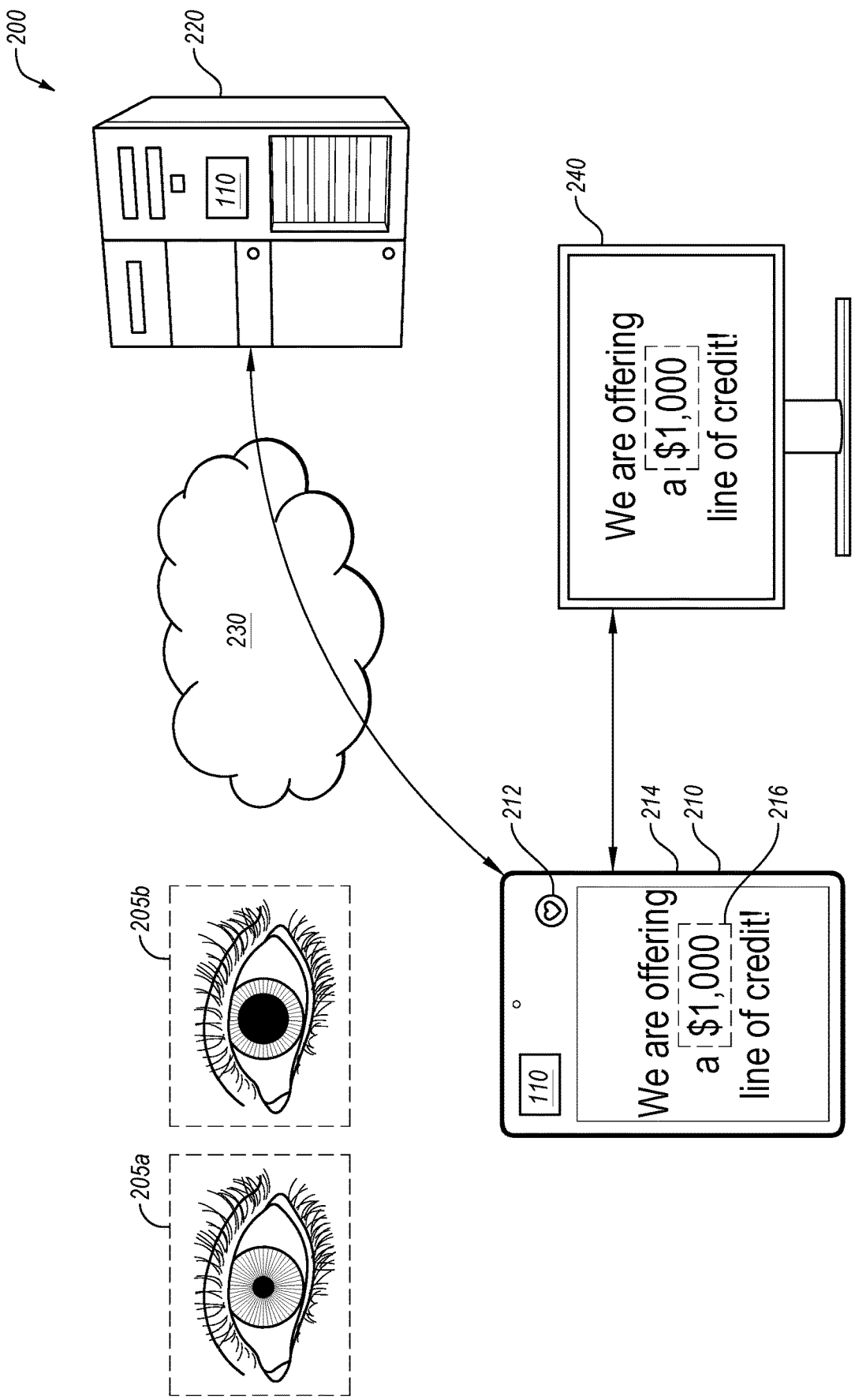
FIG. 2 is a diagram illustrating an example environment in which a system to modify content based on eye characteristics may be implemented.

FIG. 2 is a diagram illustrating an example environment 200 in which a system to modify content based on eye characteristics may be implemented, in accordance with one or more embodiments of the present disclosure. The environment 200 may include an electronic device 210, a remote device 220, a network 230, and a display 240. The electronic device 210 may be in communication with the remote device 220 and/or the display 240, for example, over the network 230. The environment 200 may include the content modification module 110 of FIG. 1, for example, in the electronic device 210 and/or the remote device 220. The environment 200, via the content modification module 110, may monitor constriction of a pupil 205a and/or dilation of a pupil 205b.

The electronic device 210 may include any device, system, component, or combination thereof configured to monitor a characteristic of an eye, such as constriction 205a and/or dilation 205b of a pupil of the eye. In some embodiments, the electronic device 210 may include an optical scanner 212, a display 214, and content 216 displayed on the display 214. The electronic device may additionally or alternatively include the content modification module 110.

The optical scanner 212 may include any device, system, component, or combination thereof configured to capture a depiction of an eye. For example, the optical scanner 212 may include a camera (including a video, digital, or analog camera), an infrared scanner, an iris scanner, a laser scanner, a charge-coupled device (CCD) sensor, a complementary metal-oxide-semiconductor (CMOS) sensor, or any other photosensor. The optical scanner 212 may be configured to capture a depiction of an eye and provide the depiction of the eye to the content modification module 110. In some embodiments, the optical scanner 212 may be configured to capture multiple depictions of the eye (e.g., a video) such that a rate of change can be determined for the characteristic of the eye (e.g., how quickly or how slowly the eye dilates 205b or constricts 205a).

In some embodiments, the optical scanner 212 may be configured to track movement of the eye. For example, the optical scanner 212 may be configured to stay focused on and continue to capture depictions of the eye. In some embodiments, tracking the movement of the eye may be configured to be incorporated into other aspects of the electronic device 210. For example, if the display 214 is configured to provide a virtual reality environment to the user, the optical scanner 212 may be configured to track movements of the eye of the user such that the virtual reality environment can respond to the eye movements of the user. For example, when playing a game the eye movements of the user may be tracked such that the game may respond to where the user is looking in the virtual environment. As another example, when in a virtual marketplace or store, the eye movements of the user may be tracked such that items being observed and/or considered for purchase may be discerned.

Additionally or alternatively, by tracking movement of the eye, the content modification module 110 may know which content to modify. For example, if multiple elements of the content 216 may be modified, tracking the movement of the eye of the user may facilitate identifying which element of the content is causing particular mental engagement, or mental disengagement. In these and other embodiments, the content modification module 110 may modify the content 216 that caused the mental engagement and/or mental disengagement.

The display 214 may include any device, system, component, or combination thereof configured to present the content 216 to a user. For example, the display 214 may be configured to present financial information, advertisements, and/or any other content to the user. In some embodiments, the display 214 may respond to a message to present a modification to the content 216.

In addition to having the display 214 as an integral part of the electronic device 210, the electronic device 210 may communicate with a separate display 240. For example, the display 240 may be associated with a secondary device located in a store or other third party venue where the user may be visiting, and the content modification module 110 of the electronic device 210 may be configured to communicate with the display 240 how to modify the content. Additionally or alternatively, the electronic device may communicate the level of engagement of the user, or a characteristic of the eye or modification thereof (including a rate of change to the characteristic) to the display 240. For example, a merchant may operate the display 240 and the display 240 may be in communication with the electronic device 210 such that the display 240 may modify content based on information from the electronic device 210 associated with the user. As another example, the display 240 may be associated with a secondary device associated with the user (e.g., a desktop computer) and may be in communication with the electronic device 210 (e.g., a mobile telephone) such that the display 240 may modify content based on information from the electronic device 210 associated with the user.

In some embodiments, the remote device 220 may include the content modification module 110. In these and other embodiments, one or more of the data components received by the content modification module 110 as illustrated in FIG. 1 may be obtained by the electronic device 210 and provided to the remote device 220. For example, the electronic device 210 may capture a depiction of the eye of the user utilizing the optical scanner 212. The depiction may be transmitted to the remote device 220 and the content modification module 110 of the remote device 220 may determine a characteristic of the eye in the captured depiction and may compare it to a reference characteristic stored at the remote device. As another example, the electronic device 210 may capture a depiction of an eye and may determine modification of a characteristic of the eye (e.g., the eye is dilated or the eye dilated at a certain rate) and provide that information to the remote device 220 to generate and/or provide modified content based on the modification of the characteristic.

In some embodiments, when the content modification module 110 is included in the electronic device 210, one or more of the data components received by the content modification module 110 as illustrated in FIG. 1 may be obtained by the remote device 220 and provided to the electronic device 210. For example, the electronic device 210 may obtain a reference pupil size of the user from the remote device 220. In these and other embodiments, the remote device 220 may include a repository of reference pupil sizes for multiple users. For example, the user may sign up for an eye characteristic measuring service operated by the remote device 220 such that third party services and/or devices (e.g., the electronic device 210) may obtain the reference pupil size from the remote device 220.

In some embodiments, the remote device 220 may be associated with a merchant or payment service (e.g., PAY-PAL). For example, the merchant or payment service may store one or more characteristics of the user such that the merchant or payment service may facilitate the user receiving modified content based on modifications of the user characteristic. Additionally or alternatively, the merchant or payment service may utilize the remote device 220 to verify an identity of a user based on the degree of dilation and/or constriction and/or the rate of dilation and/or constriction. For example, such identity verification may replace or augment a password input requirement.

In some embodiments, various tasks of the content modification module 110 may be divided between the content modification module 110 in the electronic device 210 and the remote device 220.

One skilled in the art, after reviewing this disclosure, may recognize that modifications, additions, or omissions may be made to FIG. 2 without departing from the scope of the disclosure. For example, the environment 200 may include any number of electronic devices, displays, and/or remote devices. Further, each of the devices and systems illustrated may include any number of other elements not expressly described.

Figure 3:
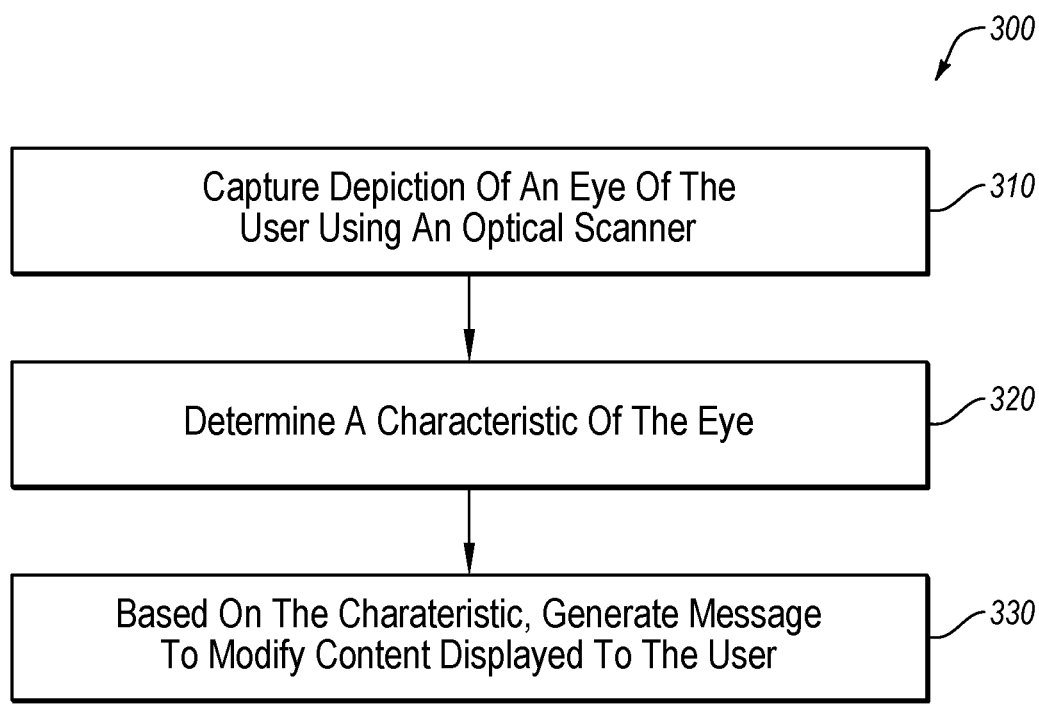
FIG. 3 is a flow diagram illustrating an example method of modifying content based on eye characteristics.

FIG. 3 is a flow diagram illustrating an example method 300 of modifying content based on eye characteristics, in accordance with one or more embodiments of the present disclosure. One or more operations of the method 300 may be performed by a system or device, such as the content modification module 110 of FIGS. 1 and 2 or by the devices 210 and/or 220 of FIG. 2. In these and other embodiments, the method 300 may be performed based on the execution of instructions stored on one or more non-transitory computer-readable media. Although illustrated as discrete blocks, various blocks of method 300 may be divided into additional blocks, combined into fewer blocks, or eliminated, depending on the desired implementation.

At block 310, a depiction of an eye may be captured using an optical scanner. For example, an optical scanner (e.g., the optical scanner 212 of FIG. 2) of an electronic device (such as the electronic device 210 of FIG. 2) may capture a depiction of the eye. A camera or video camera, for example, may capture an image or a video of the eye. As another example, an infrared scanner or laser may take a scan of the eye to capture a depiction of the eye.

At block 320, a characteristic of the eye may be determined. For example, a content modification module (e.g., the content modification module 110 of FIGS. 1 and/or 2) may determine a size of a pupil of the eye, an amount of dilation of the pupil, an amount of constriction of the pupil, and/or other characteristics. In some embodiments, the characteristic may be determined by comparing the depiction of the eye of block 310 with a reference characteristic of the eye.

At block 330, based on the characteristic, a message may be generated to modify content displayed to the user. For example, if the user is presented with terms and conditions of an electronic service and the pupil of an eye of the user transitions from dilated to constricted, a message may be generated to display modified content including a message suggesting the user take a break and return to finish reading the terms and conditions later. In these or other embodiments, the content itself may be modified and the modified content may be communicated to a display of the electronic device or a display of a secondary device for display.

In some embodiments, the message of block 330 may be sent to another component of the same device (e.g., from the content modification module 110 to the display 214 of the electronic device 210 of FIG. 2) or from one device to another device (e.g., from the electronic device 210 to the remote device 220 and/or the display 240).

One skilled in the art, after reviewing this disclosure, may recognize that modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

For example, in some embodiments, the method 300 may include operations related to determining a level of mental engagement of the user with respect to the content based on the characteristic of the eye, and modifying the presentation of the content based on the level of mental engagement.

As another example, in some embodiments, capturing a depiction of an eye of the user may include capturing video images of the eye of the user and the operations may further include continually detecting the eye characteristic in the video images and detecting a change in the eye characteristic beyond a threshold amount of change in which comparing the eye characteristic of the user in the depiction utilizes a video image associated with when the eye characteristic changed beyond the threshold.

Figure 4:
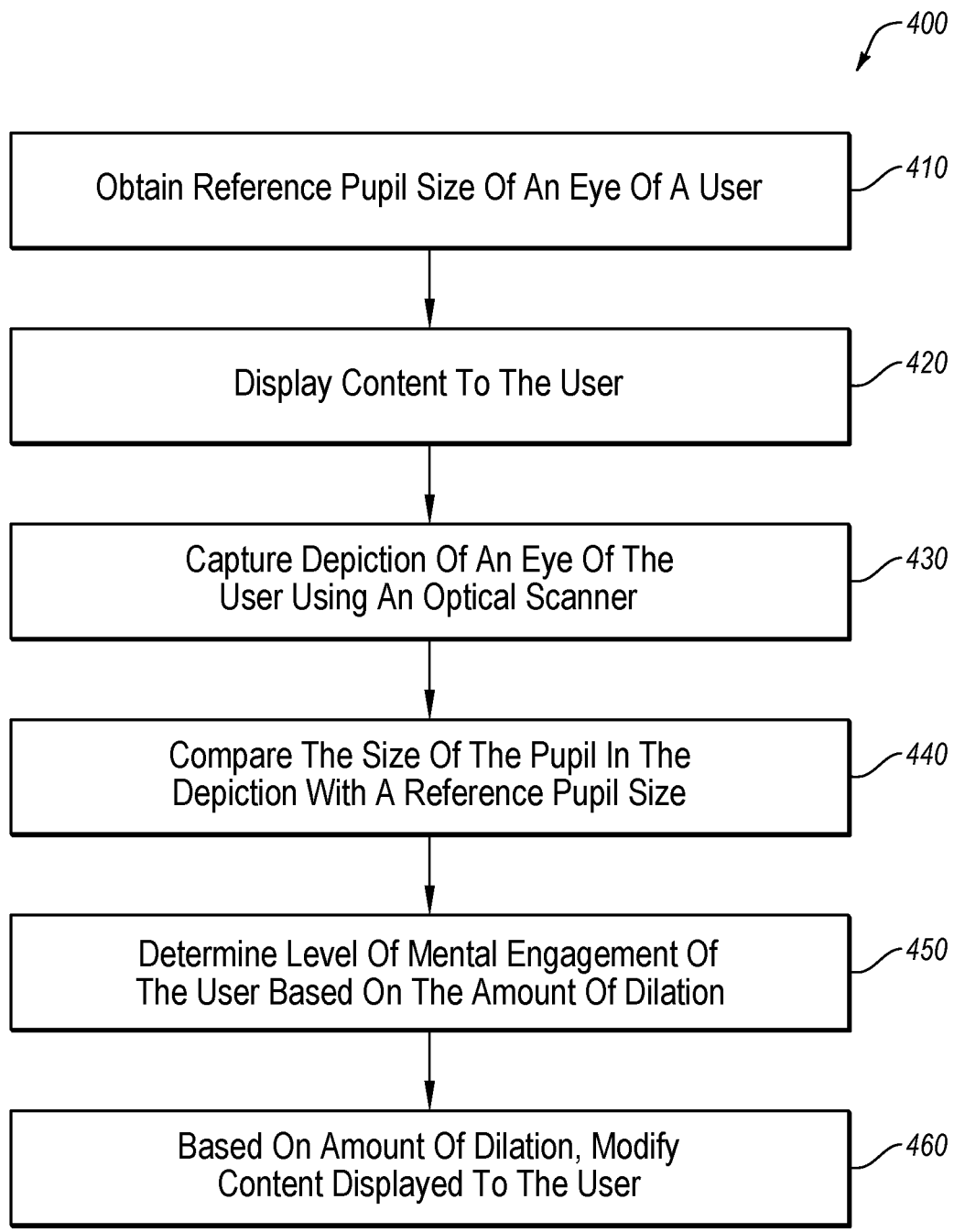
FIG. 4 is a flow diagram illustrating another example method of modifying content based on eye characteristics.

FIG. 4 is a flow diagram illustrating another example method 400 of modifying content based on eye characteristics, in accordance with one or more embodiments of the present disclosure. One or more operations of the method 400 may be performed by a system or device, such as the content modification module 110 of FIGS. 1 and 2 or by the devices 210 and/or 220 of FIG. 2. In these and other embodiments, the method 400 may be performed based on the execution of instructions stored on one or more non-transitory computer-readable media. Although illustrated as discrete blocks, various blocks of method 400 may be divided into additional blocks, combined into fewer blocks, or eliminated, depending on the desired implementation.

At block 410, a reference pupil size of an eye of a user may be obtained. For example, an optical scanner (such as the optical scanner 212 of FIG. 2) may capture a depiction of the eye of the user during a known state, such as relaxed, dilated, or constricted. Additionally or alternatively, the reference pupil size of the eye may be provided by another device.

At block 420, content may be displayed to the user. For example, content such as financial information, a number series, or terms and conditions may be presented to the user.

At block 430, a depiction of the eye of the user may be captured using an optical scanner. The block 430 may be similar or comparable to the block 310 of FIG. 3.

At block 440, the size of the pupil in the depiction may be compared with the reference pupil size. For example, a content modification module (such as the content modification module 110 of FIGS. 1 and 2) may determine where the pupil is in the depiction of the eye and determine a size of the pupil (for example, using color difference detecting techniques or any other process to identify the location of the pupil in the image compared to the rest of the eye). The comparison of the block 440 may yield an amount of dilation and/or constriction, a rate of dilation and/or constriction, and/or any combinations thereof.

At block 450, a level of mental engagement of the user may be determined based on an amount of dilation. For example, if the pupil is determined to be dilated, or to have been dilated at a rapid rate, the content modification module may determine a high level of mental engagement. Alternatively, if the pupil is determined to be constricted or to have dilated with a slow rate of dilation, a lower level of mental engagement may be determined.

At block 460, the content displayed to the user may be modified based on the amount of dilation. For example, if the eye of the user is initially dilated followed by constriction of the pupil while being presented with terms and conditions, modified content (such as a message to wait and continue reading the terms and conditions later) may be presented to the user. In some embodiments, the modified content may include access to a restricted resource, changed financial terms, additional explanation regarding a term that may be confusing, or any other modification.

One skilled in the art, after reviewing this disclosure, may recognize that modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
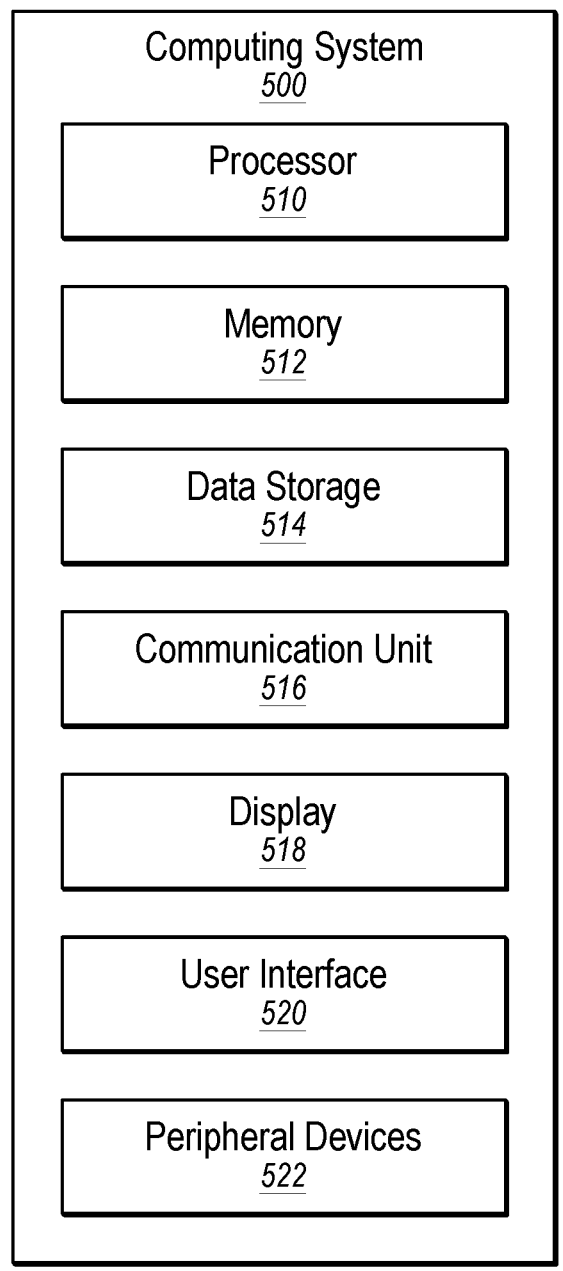
FIG. 5 illustrates an example computing system that may be used in a system configured to modify content based on eye characteristics.

FIG. 5 illustrates an example computing system 500 ("system 500") that may be used in a system configured to modify content based on eye characteristics, in accordance with one or more embodiments of the present disclosure. The system 500 may include a processor 510, a memory 512, data storage 514, a communication interface 516, a display 518, a user interface unit 520, and a peripheral device 522, which all may be communicatively coupled. In some embodiments, at least a portion of the system 500 may be part of any of the systems or devices described in this disclosure. For example, For example, the system 500 may be included in or part of the devices 210, 220, and/or 230 of FIG. 2.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512, the data storage 514, or the memory 512 and the data storage 514. In some embodiments, the processor 510 may fetch program instructions from the data storage 514 and load the program instructions into the memory 512.

After the program instructions are loaded into the memory 512, the processor 510 may execute the program instructions. In these and other embodiments, the content modification module 110 of FIGS. 1 and 2 may be stored in the memory 512 and/or the data storage 514 and may be loaded and executed by the processor 510 to perform operations with respect to modifying content.

The memory 512 and the data storage 514 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 510. By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform or control performance of a certain operation or group of operations as describe in this disclosure.

The communication interface 516 may include any component, device, system, or combination thereof that is configured to transmit or receive information over a network. In some embodiments, the communication interface 516 may communicate with other devices at other locations, the same location, or even other components within the same system. For example, the communication interface 516 may include a modem, a network card (wireless or wired), an infrared communication device, a wireless communication device (such as an antenna), and/or chipset (such as a Bluetooth device, near-field communication (NFC) device, an 802.6 device (e.g., Metropolitan Area Network (MAN)), a WiFi device, a WiMax device, cellular communication facilities, etc.), and/or the like. The communication interface 516 may permit data to be exchanged with a network and/or any other suitable devices or systems, such as those described in the present disclosure. For example, when the system 500 is included in the device 210, 220, and/or 230 of FIG. 2, the communication interface 516 may allow the device 210, 220, and/or 230 to communicate with one or more other devices over the network 230 of FIG. 2 and/or other communication avenues.

The display 518 may be configured as one or more displays, like an LCD, LED, or other type of display. The display 518 may be configured to present content such as video, text captions, user interfaces, and other data as directed by the processor 510. For example, when the system 500 is included in the device 210, 220, and/or 230 of FIG. 2, the display 518 may be configured to present content and/or modified content.

The user interface unit 520 may include any device to allow a user to interface with the system 500. For example, the user interface unit 520 may include a mouse, a track pad, a keyboard, and/or a touchscreen, among other devices. The user interface unit 520 may receive input from a user and provide the input to the processor 510.

The peripheral devices 522 may include one or more devices. For example, the peripheral devices may include a microphone, an optical scanner, and/or a speaker, among other peripheral devices. In these and other embodiments, the microphone may be configured to capture audio. The optical scanner may be configured to capture depictions, such as digital images, infrared scans, and/or others. The digital images may be captured in a manner to produce video or image data. In some embodiments, the speaker may broadcast audio received by the system 500 or otherwise generated by the system 500.

The system 500 may include or be included in a mobile device (such as a cellular telephone, e-reader, mobile gaming system, laptop, and/or others), a desktop computer, a server computer, an Internet connected device (e.g., a thermostat, security system, refrigerator, and/or others), wearable devices (e.g., a smart watch, smart glasses, fitness tracker, and/or others), or any other device.

One skill in the art, after reviewing this disclosure, may recognize that modifications, additions, or omissions may be made to the system 500 without departing from the scope of the present disclosure. For example, the system 500 may include more or fewer components than those explicitly illustrated and described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A device comprising:
   an optical scanner;
   a display;
   one or more non-transitory computer-readable storage media storing instructions; and
   one or more processors configured to execute the instructions to cause the device to perform operations, the operations comprising:
      presenting content to a user of the device via the display;
      continually capturing a depiction of an eye of the user via the optical scanner;
      continually comparing a size of a pupil of the eye of the user in the depiction to a reference size of a pupil stored in the one or more storage media to determine a rate of dilation of the eye of the user;
      among multiple elements of the presented content, identifying a first element that the user's eyes are currently looking at based on tracking movement of the eye of the user via the optical scanner;
      determining, based on the determined rate of dilation satisfying a dilation threshold, that the user does not understand information included in the identified first element; and
      modifying, while the first element is being displayed to the user and based on the determined rate of dilation, the identifying, and determining that the user does not understand the information included in the identified first element, the presentation of the content including adding a second element to the content, wherein the second element includes an explanation of the information included in the identified first.

2. The device of claim 1, wherein the modifying is further based on:
   determining, based on comparing a size of the pupil of the eye of the user in the depiction to the reference size of the pupil, an amount of dilation of the eye.

3. The device of claim 1, wherein capturing a depiction of an eye of the user includes capturing video images of the eye of the user, the operations further comprising:
   continually detecting the size of the pupil in the video images; and
   detecting a change in the size beyond a threshold amount of change, wherein comparing the size of the pupil of the user in the depiction utilizes a video image associated with when the size changed beyond the threshold.

4. The device of claim 1, wherein the second element further includes the information in the identified first element displayed using different terminology.

5. The device of claim 1, wherein the operations further comprise:
   capturing a reference image of the eye of the user; and
   determining the reference size of the pupil from the reference image.

6. The device of claim 1, wherein the operations further comprise receiving the reference size of the pupil from another device.

7. The device of claim 1, wherein the depiction of the eye includes any combination of one or more types of depictions from the following group of types of depictions: a retinal scan, an infrared scan, and a photographic image.

8. The device of claim 1, wherein the presented content includes terms and conditions associated with an account, and wherein modification of the content further includes modifying the terms and conditions.

9. A method comprising:
   continually capturing a depiction of an eye of a user via an optical scanner;
   continually determining, based on comparing a size of a pupil of the eye of the user in the depiction to a reference size of a pupil, a rate of dilation of the eye of the user from the depiction of the eye;
   among multiple elements of content displayed to the user, identifying a first element that the user's eyes are currently looking at based on tracking movement of the eye of the user via the optical scanner;
   determining, based on the determined rate of dilation satisfying a dilation threshold, that the user does not understand information included in the identified first element; and
   causing modification of the displayed content, while the first element is being displayed to the user and based on the determined rate of dilation, the identifying, and determining that the user does not understand the information included in the identified first element, wherein the content includes terms and conditions associated with an account, and wherein modification of the content includes adding an explanation of a term in the terms and conditions.

10. The method of claim 9, further comprising:
    determining, based on the rate of dilation, that the user is a human; and
    in response to determining that the user is a human, granting the user access to an electronic resource.

11. The method of claim 9, wherein the causing the modification is further based on:
    determining, based on comparing a size of the pupil of the eye of the user in the depiction to the reference size of the pupil, an amount of dilation of the eye.

12. The method of claim 9, further comprising transmitting the modified content to another device via a communication device.

13. The method of claim 9, wherein modification of the content further includes adding a second element that includes the information in the identified first element displayed using different terminology.

14. The device of claim 1, the operations further comprising:
    determining, based on the rate of dilation, that the user is a human; and
    in response to determining that the user is a human, granting the user access to an electronic resource.

15. One or more non-transitory computer-readable storage media storing instructions, that when executed by one or more processors cause the one or more processors to perform or control performance of operations, the operations comprising:
    presenting content to a user via a display;
    continually capturing a depiction of an eye of the user via an optical scanner;

continually comparing a size of a pupil of the eye of the user in the depiction to a reference size of a pupil stored in the one or more storage media to determine a rate of dilation of the eye of the user;

among multiple elements of the presented content, identifying a first element that the user's eyes are currently looking at based on tracking movement of the eye of the user via the optical scanner;

determining, based on the determined rate of dilation satisfying a dilation threshold, that the user does not understand information included in the identified first element; and modifying, while the first element is being displayed to the user and based on the determined rate of dilation, the identifying, and determining that the user does not understand the information included in the identified first element, the presentation of the content including adding a second element to the content, wherein the second element includes an explanation of the information included in the identified first element.

16. The computer-readable storage media of claim 15, wherein the second element further includes the information in the identified first element displayed using different terminology.

17. The computer-readable storage media of claim 15, wherein capturing a depiction of an eye of the user includes capturing video images of the eye of the user, the operations further comprising:

continually detecting the size of the pupil in the video images; and detecting a change in the size beyond a threshold amount of change, wherein comparing the size of the pupil of the user in the depiction utilizes a video image associated with when the size changed beyond the threshold.

18. The computer-readable storage media of claim 15, wherein the operations further comprise:

capturing a reference image of the eye of the user; and determining the reference size of the pupil from the reference image.

19. The computer-readable storage media of claim 15, wherein the depiction of the eye includes any combination of one or more types of depictions from the following group of types of depictions: a retinal scan, an infrared scan, and a photographic image.

20. The computer-readable storage media of claim 15, wherein the operations further comprise:

determining, based on the rate of dilation, that the user is a human; and in response to determining that the user is a human, granting the user access to an electronic resource.

* * * * *